(12) United States Patent
Hildebrand et al.

(10) Patent No.: US 8,394,163 B2
(45) Date of Patent: Mar. 12, 2013

(54) CONDUIT PIECE FOR THE ABSORPTION OF FOREIGN BODIES

(75) Inventors: Ingo Hildebrand, Laupheim (DE); Alfred Huber, Maselheim (DE)

(73) Assignee: Diehl Aircabin GmbH, Laupheim (DE)

( * ) Notice: Subject to any disclaimer, the term of this patent is extended or adjusted under 35 U.S.C. 154(b) by 93 days.

(21) Appl. No.: 12/968,374

(22) Filed: Dec. 15, 2010

(65) Prior Publication Data

US 2011/0138758 A1 Jun. 16, 2011

(30) Foreign Application Priority Data

Dec. 15, 2009 (DE) .......................... 10 2009 058 352

(51) Int. Cl.
*B01D 45/00* (2006.01)
(52) U.S. Cl. ................ 55/440; 55/434; 55/462; 55/464; 55/465; 55/442; 55/445; 55/446
(58) Field of Classification Search .................... 55/440, 55/434, 462, 464, 465, 442, 445, 446
See application file for complete search history.

(56) References Cited

U.S. PATENT DOCUMENTS 2,489,618 A 11/1949 Cantin

FOREIGN PATENT DOCUMENTS

| CH | 266734 | 5/1950 |
| DE | 1 421 322 | 10/1968 |
| DE | 33 44 070 A1 | 7/1985 |

OTHER PUBLICATIONS

English Abstract of GB 638094, dated May 31, 1950.

*Primary Examiner* — Jason M Greene
*Assistant Examiner* — Dung H Bui
(74) *Attorney, Agent, or Firm* — Scully, Scott, Murphy & Presser, P.C.

(57) ABSTRACT

A conduit piece for the absorption of foreign bodies in an air distribution conduit of an air-conditioning installation, with a bent portion, the inner wall (I) of which has a large bend radius (Rg) and a small bend radius (Rk). To avoid flow noises according to the invention, an interception device (1, 10, 11, 13, 14) be provided in the region of the large bend radius (Rg) for the purpose of intercepting foreign bodies carried through the conduit piece together with the air.

10 Claims, 5 Drawing Sheets

CONDUIT PIECE FOR THE ABSORPTION OF FOREIGN BODIES

BACKGROUND OF THE INVENTION

The invention relates to a conduit piece for the absorption of foreign bodies in an air distribution conduit of an air-conditioning installation. It relates particularly to a conduit piece for the production of an air distribution system of an air-conditioning installation in an aircraft cabin.

BACKGROUND

According to the prior art, the problem arises that noise is sometimes generated by foreign bodies at air outlet ports of the air distribution system of an air-conditioning installation. Such generation of noise is disruptive to comfort, particularly in passenger aircraft, and is undesirable.

SUMMARY

The object of the invention is to eliminate the disadvantages of the prior art. In particular, an undesirable generation of noise at an air outlet port of an air distribution conduit of an air-conditioning installation is to be avoided.

According to the invention, a conduit piece for the absorption of foreign bodies in an air distribution conduit of an air-conditioning installation is proposed, having a bent portion, the inner wall of which has a large bend radius and a small bend radius, an interception device being provided in the region of the large bend radius for the purpose of intercepting foreign bodies carried through the conduit piece together with the air. The invention is based on the recognition that an undesirable generation of noise at an air outlet port of an air distribution conduit is caused by foreign bodies carried in the air. Since a conduit piece having the interception device for foreign bodies is provided in the air distribution conduit, the undesirable generation of noise at the air outlet port is avoided.

In the context of the present invention, the term "bend radius" is understood to mean both a radius of curvature of a bend line on the inner wall of the conduit piece and the bend line itself. A plane containing the bend line stands perpendicularly to a cross-sectional plane containing the diameter of the conduit piece.

According to an advantageous refinement, the interception device comprises at least one intersection pocket having an orifice. The interception device expediently comprises a plurality of interception pockets arranged one behind the other in the direction of flow of the air.

The orifice is expediently located in a half of the inner wall which comprises the large bend radius. The abovementioned half of the inner wall is delimited by a mid-plane which runs perpendicularly with respect to a bend-radius plane connecting the large and the small bend radius.

According to a further refinement, the interception device has a grid arranged approximately parallel to the inner wall. The air stream passing through the grid is braked. This ensures that the foreign bodies are intercepted effectively in the at least one interception pocket located behind the grid. The grid expediently spans the orifice of the interception pocket. The foreign bodies may be, for example, ice particles.

In a further refinement, the interception pocket projects radially in the direction of the small bend radius, and an orifice of the interception pocket is directed opposite to a predetermined direction of flow of the air. According to a further refinement, it may also be that the interception pocket projects radially outwards beyond the large bend radius, and an orifice of the interception pocket is formed by a recess on the inner wall. This refinement avoids the interception pocket causing a reduction in size of the flow cross section.

According to a further, especially advantageous refinement, the interception device is designed as an insert which comprises the interception pocket or which, in the inserted state, forms the interception pocket together with the inner wall. Such an insert can be produced relatively simply and cost-effectively. It is also suitable particularly for the retrofitting of existing air distribution conduits. During use, the interception pocket can project radially in the direction of the large bend radius beyond a further bend radius of the insert, and an orifice of the interception pocket is expediently formed by a recess on an insert wall. That is to say, in the proposed refinement, the interception pocket is therefore arranged between the insert wall and that inner-wall half of the conduit piece which contains the large bend radius.

Furthermore, it has proved especially advantageous that the conduit piece is composed of a first segment preferably containing the large bend radius and a second segment preferably containing the small bend radius. The conduit piece is expediently formed from two half-shells which, for example, can be latched with one another by means of a latching connection. It may also be, however, that the half-shells are welded or adhesively bonded to one another. In this refinement, the insert can be mounted especially simply, for example by being introduced into one of the two half-shells. The insert can be fastened simultaneously with the connection of the two half-shells. The conduit piece according to the invention can consequently be produced quickly, simply and cost-effectively.

The conduit piece may be, for example, a conduit bend, a conduit branch piece or a connection piece.

Further according to the invention, an aircraft cabin is provided, comprising an air-conditioning installation with an air distribution system which contains at least one conduit piece according to the invention. In this case, the conduit piece is expediently arranged in a last, penultimate or last but two bend upstream of an air outlet port. Further, it has proved expedient to configure an air distribution system in an aircraft cabin such that the conduit pieces according to the invention are in each case arranged in the region of a floor of the aircraft cabin. The ice particles are additionally held in the interception device as a result of gravity. This applies particularly when the air outlet port is located above the floor of the aircraft cabin, that is to say an air distribution pipe extending to the air outlet port extends in a vertical direction from the conduit piece according to the invention.

According to a further refinement, there is provision for the at least one interception pocket of the interception device to be connected to a drainage conduit. Water formed from the intercepted ice particles can consequently be discharged.

BRIEF DESCRIPTION OF THE DRAWINGS

Exemplary embodiments of the invention are explained in more detail below with reference to the accompanying drawings in which.

DETAILED DESCRIPRION OF EXEMPLARY EMBODIMENTS

Figure 1:
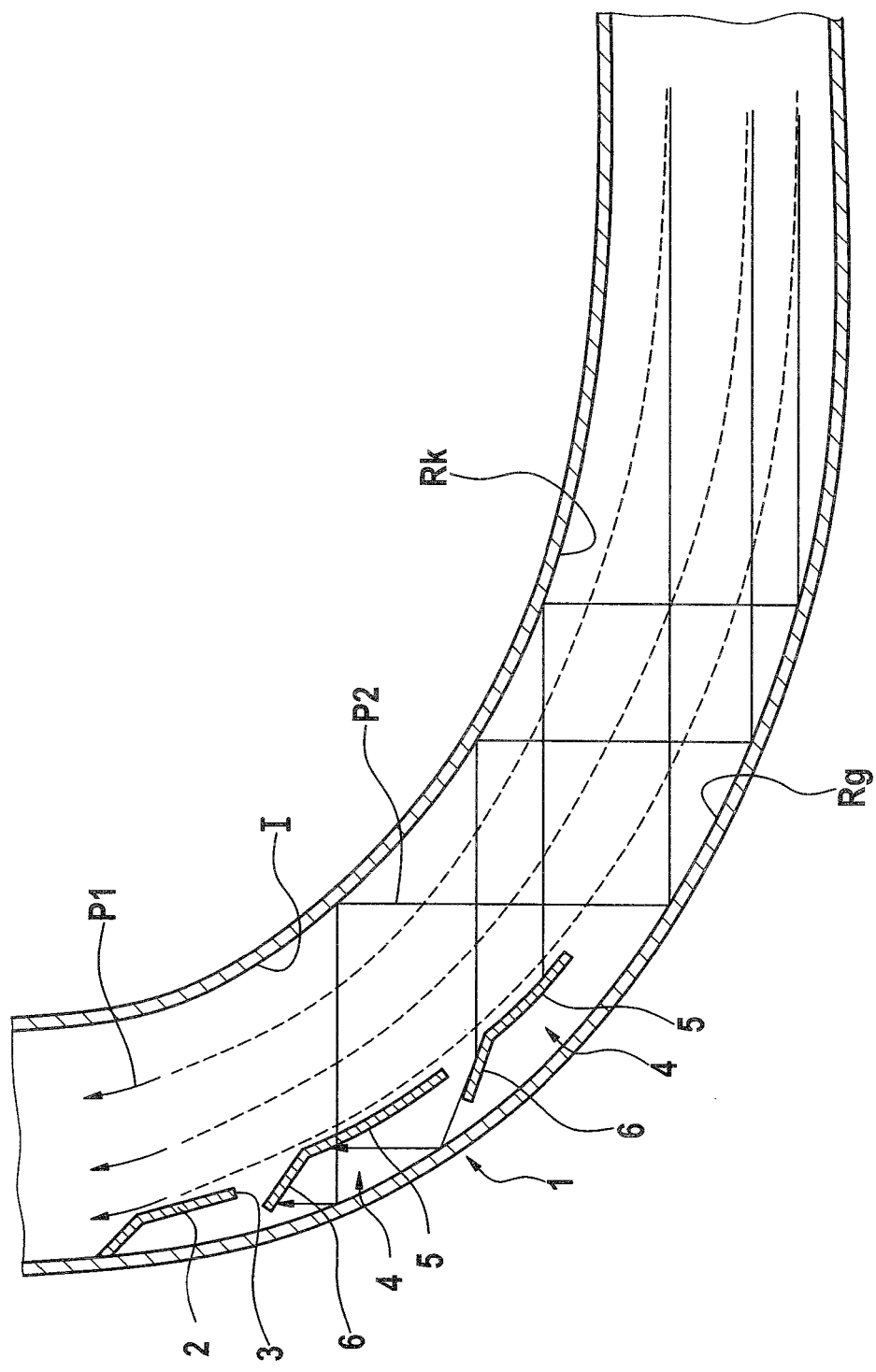
FIG. 1 shows a diagrammatic cross-sectional view through a conduit bend.

FIG. 1 shows diagrammatically a conduit piece having a bent portion. Reference symbol Rk designates a small bend radius and reference symbol Rg designates a large bend radius which describe a curvature of an inner wall designated in general by reference symbol I. A direction of flow of the air through the conduit bend is indicated by the arrows P1. A direction of flight of ice particles is indicated by the arrows P2. An interception device provided in the region of the large bend radius Rg is designated by reference symbol 1. The interception device 1 has a first interception pocket 2 which projects radially from the large bend radius Rg in the direction of the small bend radius Rk. The first interception pocket 2 is provided with an orifice 3. The first interception pocket 2 is preceded, contrary to the direction of flow designated by the first arrows P1, by a plurality of collecting devices 4 in which a wall 5 running approximately parallel to the large bend radius Rg is produced advantageously from a grid. A mesh width of the grid is in this case selected such that the ice particles can pass through the grid into the collecting device 4. Downstream of the wall 5 is provided a further wall 6 which extends from the wall 5 obliquely in the direction of the large bend radius Rg. Between the further wall 6 and the inner wall I, a gap remains, which enables ice particles to pass through along the inner wall I.

The interception device 1 functions as follows:
The ice particles transported in the air flow P1 have a higher specific gravity than the surrounding air. The ice particles are carried along a curved flow path towards the inner wall I in the region of the large bend radius Rg on account of the higher centrifugal forces acting upon them. They pass there into the region of the interception device 1, possibly after being reflected on the opposite inner wall I in the region of the small bend radius Rk. The ice particles penetrate through the walls 4, advantageously designed in the form of a grid, and are transported from there to the first interception pocket 2 by the air stream P1. They are retained in the first interception pocket 2 and consequently extracted from the air stream P1.

Figure 2:
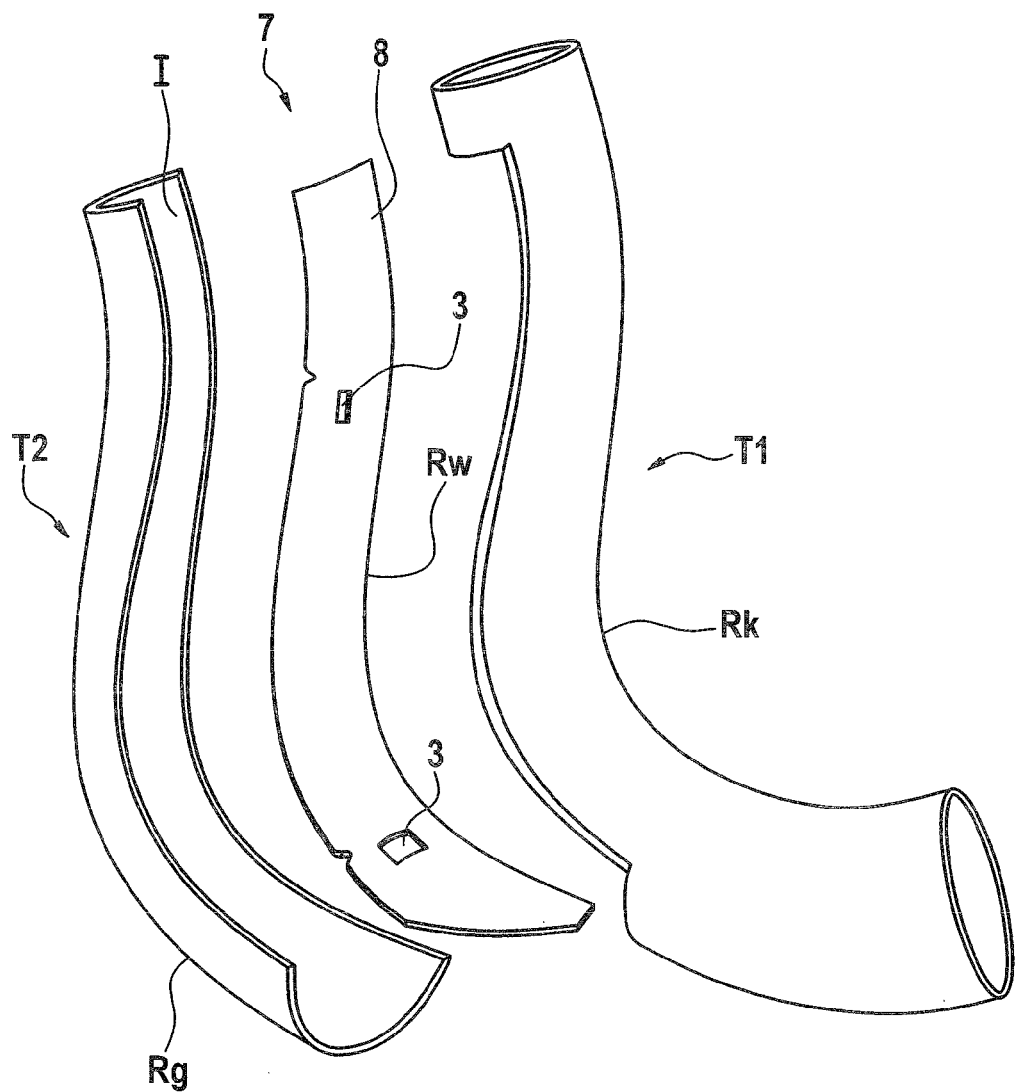
FIG. 2 shows a perspective view of a first embodiment.

FIG. 2 shows a perspective view of a first embodiment. Here, the conduit bend is formed from a first segment T1 and a second segment T2. The interception device 1 is designed here in the form of a first insert 7 which can be inserted between the first segment T1 and the second segment T2. In this case, the first insert 7 lies against the inner wall I of the second segment T2 containing the large bend radius Rg. The first insert 7 is fastened to the second segment T2 and/or is held between the segments T1, T2. As is clear from FIG. 2, the insert may have a plurality of orifices 3. The first insert 7 may, in particular, be designed such that, in the state inserted into the second segment T2, it forms a plurality of interception pockets with the inner wall I. Reference symbol 8 designates an insert wall which is arcuately curved correspondingly to the conduit bend. A radius of curvature or further bend radius is designated by reference Rw. The further bend radius Rw is smaller than the large bend radius Rg, but larger than the small bend radius Rk.

Figure 3:
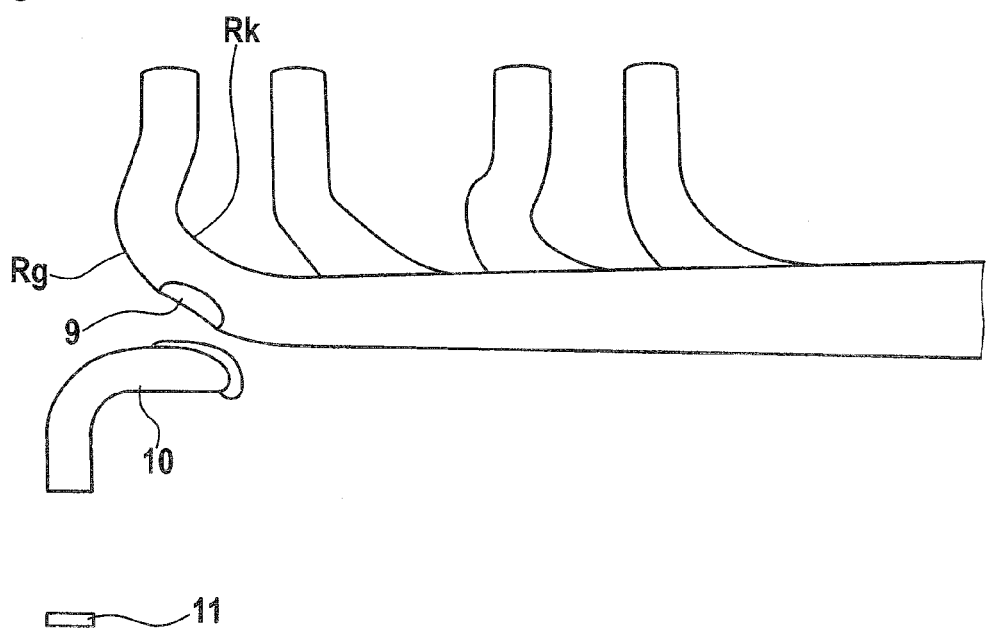
FIG. 3 shows a perspective view of a second embodiment.
Figure 4:
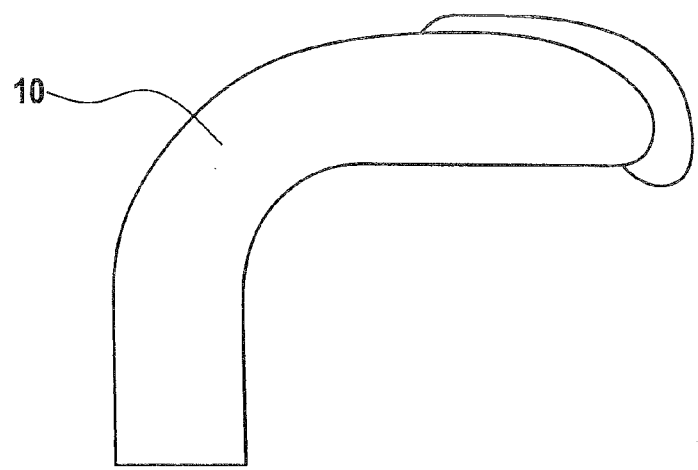
FIG. 4 shows a view of a detail according to FIG. 3.
Figure 4:

FIGS. 3 and 4 show perspective views of a second embodiment. Here, a conduit branch piece again has a curved portion with a large bend radius Rg and with a small bend radius Rk. In the region of the large bend radius Rg, the inner wall I has provided in it a perforation 9 followed by an interception pocket designed in the form of a pipe piece 10. The pipe piece 10 can be closed by means of a cap 11.

Figure 5:
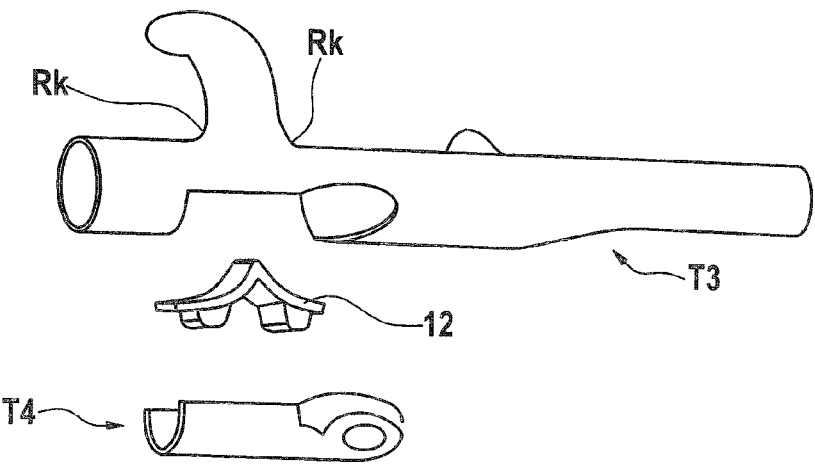
FIG. 5 shows a perspective view of a third embodiment.
Figure 6:
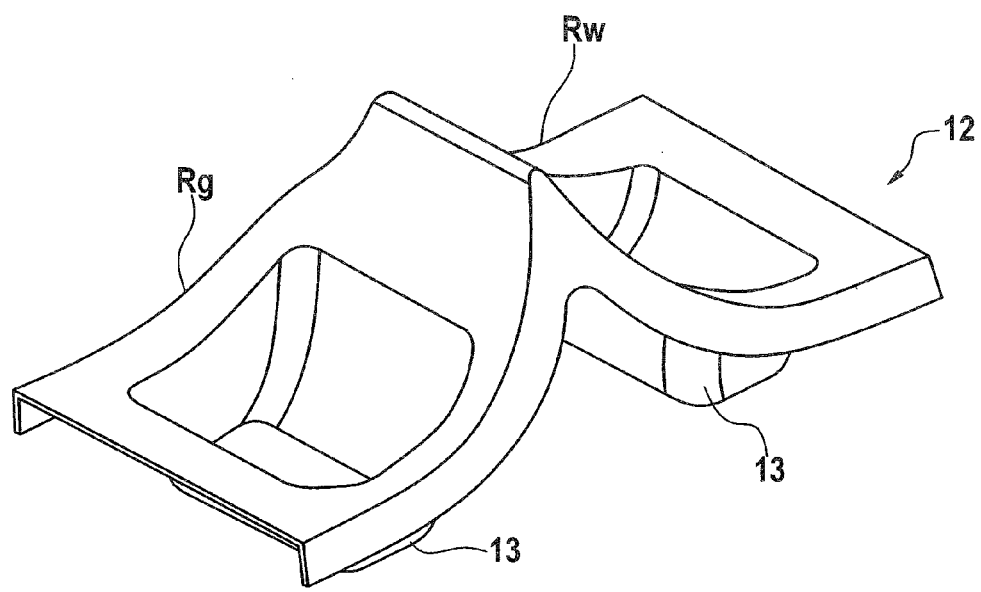
FIG. 6 shows a view of a detail according to FIG. 5.

FIGS. 5 and 6 show perspective views of a third embodiment. A line branch piece is formed here from a third segment T3 and a fourth segment T4. Reference symbol 12 designates a second insert which is provided with two second interception pockets 13. The second insert 12 serves for dividing an air stream directed towards it such as to be conducive to flow. The second insert has two large bend radii Rg which lie opposite matching small bend radii Rk on the third segment T3.

Figure 7:
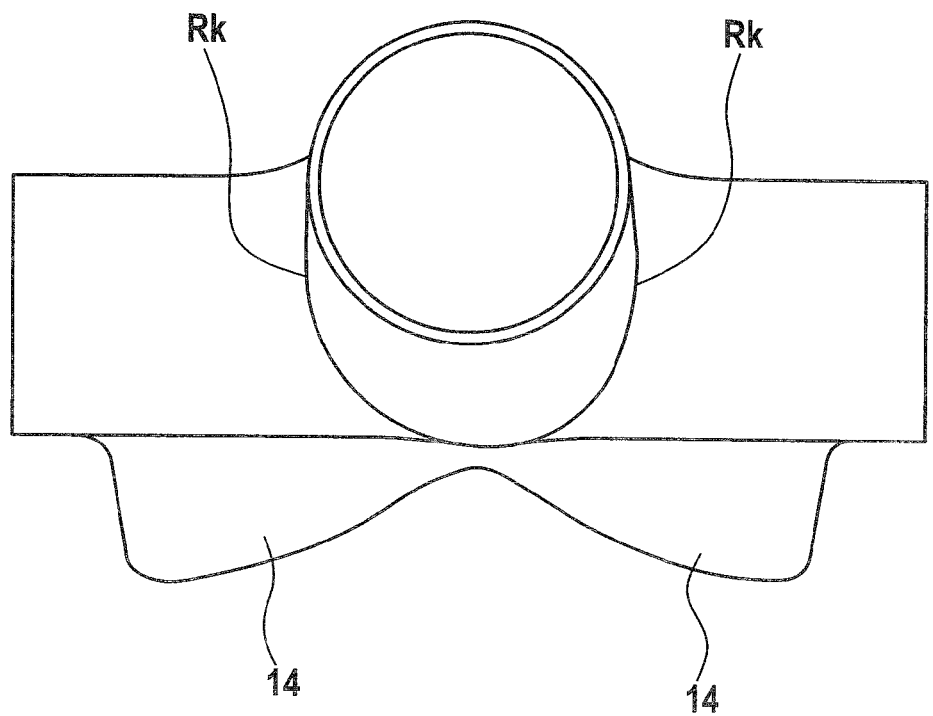
FIG. 7 shows a perspective view of a fourth embodiment.

FIG. 7 shows a perspective view of a fourth embodiment. Here, third interception pockets 14 are integrally formed on the conduit branch piece. The third interception pockets 14 are arranged, here, so as to be offset at about 90° with respect to the small bend radius Rk.

List Of Reference Symbols

1 Interception device
2 First interception pocket
3 Orifice
4 Collecting device
5 Wall
6 Further wall
7 First insert
8 Insert wall
9 Perforation
10 Pipe piece
11 Cap
12 Second insert
13 Second interception pocket
14 Third interception pocket
15 Air outlet port
I Inner wall
K Aircraft cabin
P1 Air flow
P2 Direction of flight of ice particles
Rg Large bend radius
Rk Small bend radius
Rw Further bend radius
T1 First segment
T2 Second segment
T3 Third segment
T4 Fourth segment

What is claimed is:

1. A conduit piece for the absorption of foreign bodies in an air distribution conduit of an air-conditioning installation, having a bent portion, an inner wall of which has a large bend radius and a small bend radius, an interception device being provided in the region of the large bend radius for the purpose of intercepting foreign bodies carried through the conduit piece together with the air,
wherein the interception device comprises at least one interception pocket having an orifice, and wherein the interception device is designed as an insert which comprises the interception pocket or which, in the inserted state, forms the interception pocket together with the inner wall.

2. The conduit piece according to claim 1, wherein the orifice is provided in or on a half of the inner wall which comprises the large bend radius.

3. The conduit piece according to claim 1, wherein the interception device comprises a grid arranged approximately parallel to the inner wall.

4. The conduit piece according to claim 1, wherein the interception pocket projects radially in the direction of the small bend radius, and the orifice of the interception pocket is directed opposite to a predetermined direction of flow of the air.

5. The conduit piece according to claim 1, wherein the interception pocket projects radially in the direction of the large bend radius beyond a further bend radius of the insert, and the orifice of the interception pocket is formed by a recess on an insert wall.

6. The conduit piece according to caim 1, wherein the insert is inserted between the first segment and the second segment.

7. The conduit piece according to claim 1, wherein said conduit piece is designed as a conduit bend, conduit branch piece or connection piece.

8. An aircraft cabin, comprising an air-conditioning installation with an air disribution conduit system which contains at least one conduit piece according to claim 1.

9. A conduit piece for the absorption of foreign bodies in an air distribution conduit of an air-conditioning installation, having a bent portion, the inner wall of which has a large bend radius and a small bend radius, an interception device being provided in the region of the large bend radius for the purpose of intercepting foreign bodies carried through the conduit piece together with the air, wherein the conduit piece comprises a first segment containing the large bend radius and a second segment containing the small bend radius.

10. An aircraft cabin, comprising an air-conditioning installation with an air distribution conduit system which contains at least one conduit piece according to claim 9.

* * * * *